(12) United States Patent
Wu et al.

(10) Patent No.: US 11,153,774 B2
(45) Date of Patent: Oct. 19, 2021

(54) SIGNAL TRANSMISSION METHOD AND DEVICE, AND SYSTEM

(71) Applicant: HUAWEI TECHNOLOGIES CO., LTD., Guangdong (CN)

(72) Inventors: Ming Wu, Shenzhen (CN); Chi Zhang, Shanghai (CN); Yi Qin, Kista (SE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 4 days.

(21) Appl. No.: 16/567,523

(22) Filed: Sep. 11, 2019

(65) Prior Publication Data

US 2020/0008091 A1 Jan. 2, 2020

Related U.S. Application Data

(63) Continuation of application No. PCT/CN2018/090499, filed on Jun. 8, 2018.

(30) Foreign Application Priority Data

Jun. 16, 2017 (CN) .......................... 201710459134.3

(51) Int. Cl.
*H04W 24/10* (2009.01)
*H04B 17/336* (2015.01)
(Continued)

(52) U.S. Cl.
CPC .......... *H04W 24/10* (2013.01); *H04B 17/336* (2015.01); *H04L 1/0026* (2013.01); *H04L 5/0051* (2013.01); *H04L 25/0226* (2013.01)

(58) Field of Classification Search
CPC ..... H04W 72/00; H04W 72/02; H04W 72/04; H04W 72/042; H04W 72/0426;
(Continued)

(56) References Cited

U.S. PATENT DOCUMENTS

2013/0114430 A1 5/2013 Koivisto et al.
2014/0029507 A1* 1/2014 Dimou et al. ..... H04B 7/15564
(Continued)

FOREIGN PATENT DOCUMENTS

CN 102036295 A 4/2011
CN 102368861 A 3/2012
(Continued)

OTHER PUBLICATIONS

ZTE, ZTE Microelectronics, Discussion on duplexing flexibility and cross-link interference mitigation schemes. 3GPP TSG RAN WG1 Meeting#88 Athens, Greece Feb. 13-17, 2017, R1-1701616, 8 pages.

(Continued)

*Primary Examiner* — Meless N Zewdu
(74) *Attorney, Agent, or Firm* — Womble Bond Dickinson (US) LLP (57) ABSTRACT

This application relates to the field of communications technologies and discloses a signal transmission method and device, and a system. The method includes: determining, by a first device after receiving first information transmitted by a second device, to perform at least one of interference measurement and channel measurement on a resource, or to transmit a reference signal on a resource. The second device can configure the resource of the reference signal for the first device by transmitting the first information to the first device that is in a transmitting state or a receiving state, thereby improving flexibility of resource configuration of the reference signal. When this technical solution is applied to cross interference measurement, accuracy of inter-UE interference measurement is improved.

11 Claims, 5 Drawing Sheets

(51) Int. Cl.
  *H04L 1/00* (2006.01)
  *H04L 5/00* (2006.01)
  *H04L 25/02* (2006.01)

(58) Field of Classification Search
  CPC . H04W 72/0473; H04W 76/14; H04W 76/15; H04W 76/19; H04W 88/00; H04W 88/02; H04W 88/08; H04W 92/00; H04W 92/18; H04W 24/10; H04W 28/0236; H04W 72/082; H04W 72/085; H04W 72/10; H04W 24/02; H04W 88/18; H04W 88/04; H04W 76/00; H04W 72/0406; H04W 72/0413; H04W 72/044; H04W 72/1278; H04W 72/1289; H04W 72/1294; H04W 72/14; H04W 56/0095; H04W 28/00; H04W 76/10; H04W 76/11; H04W 56/001; H04W 56/00; H04B 1/1027; H04B 1/103; H04B 1/10; H04B 1/0475; H04B 1/7097; H04B 1/71; H04B 1/7103; H04B 1/719; H04B 2001/1045; H04B 10/293; H04B 10/564; H04B 17/102; H04B 17/336; H04B 2201/71636; H04B 17/345; H04B 17/382; H04B 2201/709718; H04B 2215/00; H04B 2215/061; H04L 5/00; H04L 25/02; H04L 1/00; H04L 1/0026; H04L 5/0051; H04L 25/0226; H04L 5/0062; H04L 5/1469; H04L 5/0057; H04L 5/0048; H04L 5/0091; H04L 5/0092; H04L 5/14; H04L 2025/03783; H04L 25/0222; H04L 25/0224; H04L 25/0228; H04L 25/247; H04L 27/2613

See application file for complete search history.

(56) References Cited

U.S. PATENT DOCUMENTS

| | | | | |
|---|---|---|---|---|
| 2014/0206372 | A1* | 7/2014 | Zeng et al. | H04W 76/023 |
| 2014/0321313 | A1 | 10/2014 | Seo et al. | |
| 2014/0355529 | A1* | 12/2014 | Zhu et al. | H04L 5/0053 |
| 2015/0319796 | A1* | 11/2015 | Lu et al. | H04W 76/023 |
| 2015/0333852 | A1* | 11/2015 | Yoshizawa | H04B 17/345 |
| 2015/0358989 | A1* | 12/2015 | Ni et al. | H04W 72/1226 |
| 2016/0095131 | A1* | 3/2016 | Seo et al. | H04W 72/085 |
| 2016/0182166 | A1 | 6/2016 | Jeong et al. | |
| 2016/0198455 | A1* | 7/2016 | Caretti et al. | H04W 72/0413 |
| 2016/0316389 | A1* | 10/2016 | Kim et al. | H04W 28/048 |
| 2016/0323922 | A1* | 11/2016 | Park et al. | H04W 76/023 |
| 2016/0329981 | A1 | 11/2016 | Chung et al. | |
| 2016/0345337 | A1* | 11/2016 | Seo et al. | H04W 72/082 |
| 2017/0026939 | A1* | 1/2017 | Fodor et al. | H04W 72/042 |
| 2017/0034842 | A1* | 2/2017 | Xu et al. | H04W 72/1215 |
| 2017/0257177 | A1* | 9/2017 | Noh et al. | H04B 17/345 |
| 2018/0089423 | A1* | 3/2018 | Folco et al. | H04B 7/0417 |
| 2018/0091285 | A1* | 3/2018 | Husseini et al. | H04L 5/1469 |
| 2018/0206140 | A1* | 7/2018 | Panteleev et al. | H04W 24/10 |
| 2018/0220398 | A1* | 8/2018 | John Wilson et al. | H04W 72/042 |
| 2018/0220433 | A1* | 8/2018 | Li et al. | H04W 72/12 |
| 2018/0249453 | A1* | 8/2018 | Nagaraja et al. | H04W 72/046 |
| 2018/0279149 | A1* | 9/2018 | Li et al. | H04W 24/10 |
| 2018/0302201 | A1* | 10/2018 | Yoo et al. | H04L 5/0048 |
| 2019/0230549 | A1 | 7/2019 | Wang et al. | |
| 2019/0335474 | A1* | 10/2019 | Tang et al. | H04W 72/082 |
| 2019/0364449 | A1* | 11/2019 | Yang et al. | H04W 24/10 |
| 2020/0163059 | A1* | 5/2020 | Zhang et al. | H04W 72/042 |
| 2020/0169304 | A1* | 5/2020 | Chen et al. | H04B 7/0482 |

FOREIGN PATENT DOCUMENTS

| | | |
|---|---|---|
| CN | 102427608 A | 4/2012 |
| CN | 103716828 A | 4/2014 |
| CN | 103988456 A | 8/2014 |
| CN | 106031053 A | 10/2016 |
| CN | 106559112 A | 4/2017 |
| EP | 2852084 A1 | 3/2015 |

OTHER PUBLICATIONS

Huawei et al: "UE-to-UE measurement for cross-link interference mitigation",3GPP Draft;R1-1706911, May 14, 2017,total 7 pages.

ZTE,"Discussion on Measurements and RS Design for CLI Mitigation",3GPP TSG RAN WG1 Meeting #89 R1-1707204,Hangzhou, P.R.China, May 15-19, 2017,total 9 pages.

ZTE et al: "Discussion on Measurement and RS Design for CLI Mitigation",3GPP Draft;R1-1700271, Jan. 9, 2017,total 8 pages.

* cited by examiner

SIGNAL TRANSMISSION METHOD AND DEVICE, AND SYSTEM

CROSS-REFERENCE TO RELATED APPLICATIONS

This application is a continuation of International Application No. PCT/CN2018/090499, filed on Jun. 8, 2018, which claims priority to Chinese Patent Application No. 201710459134.3, filed on Jun. 16, 2017. The disclosures of the aforementioned applications are hereby incorporated by reference in their entireties.

TECHNICAL FIELD

This application relates to the field of communications technologies, and in particular, to a signal transmission method and device, and a system.

BACKGROUND

In a long term evolution-advanced (LTE-A) system, interference measurement is reported in two manners: a class A (CLASS A) and a class B (CLASS B). For the class A, within one channel state information (CSI) process, a base station configures a channel state information reference signal (CSI-RS) resource and a channel state information interference measurement (CSI-IM) resource for a terminal device. If a CSI subframe set is configured for the terminal device, the base station allocates at most two CSI-IM resources to the terminal device in one CSI process. For the class B, within one CSI process, the base station configures one or more CSI-RS resources and one or more CSI-IM resources for the terminal device. For both the class A and the class B, when reporting interference measurement, the terminal device selects and reports an interference measurement result on one of the resources, and reports a CSI-RS resource indicator (CRI) corresponding to this resource.

Figure 1A:
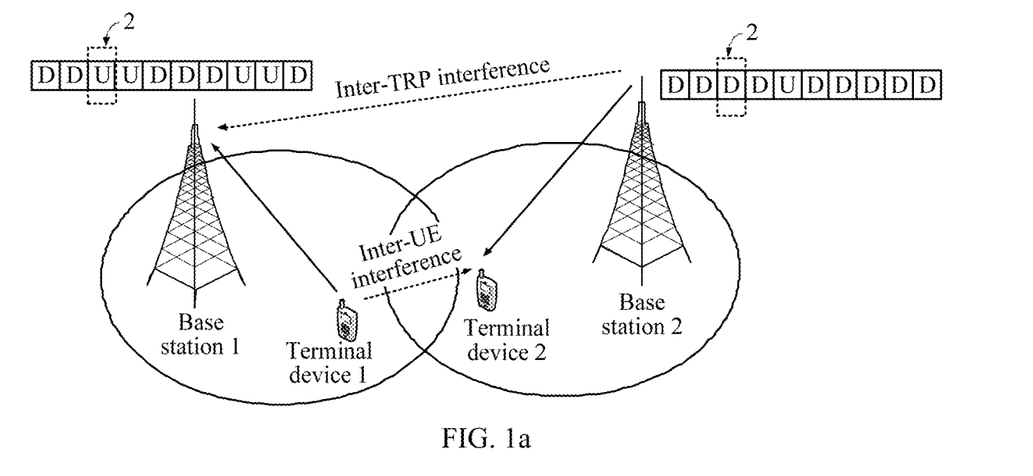
FIG. 1a and FIG. 1b are schematic diagrams of an architecture of a communications system.
Figure 1B:
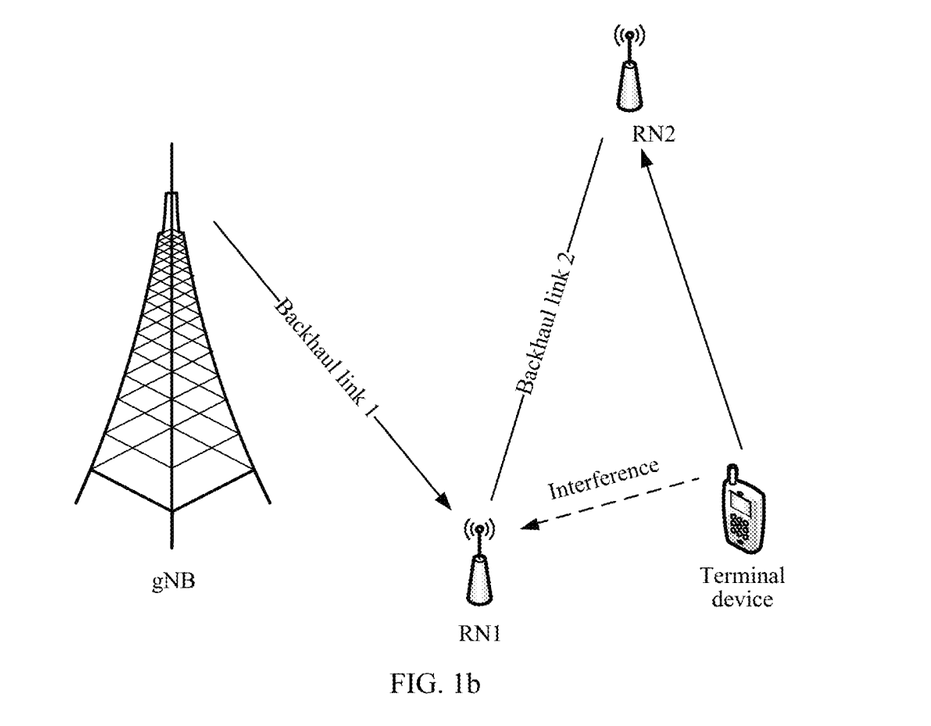

To efficiently meet an actual requirement of a traffic volume of a network-side device and improve resource utilization, a flexible duplex technology (including dynamic time division duplexing (TDD)) is introduced in the prior art to separately configure uplink transmission and downlink transmission of each cell. In this case, uplink-downlink configurations of different cells may be different, information transmission directions s of neighboring cells are different, resulting in cross-interference between uplink and downlink, that is, interference between transmission reception points (TRPs) and interference between user equipment (UE). As shown in FIG. 1a, a terminal device 1 transmits information to a base station 1 in a slot 2, and a base station 2 transmits information to a terminal device 2 in the slot 2. Therefore, the slot 2 is available for both uplink data transmission and downlink data transmission concurrently. Because a distance between the terminal device 1 and the terminal device 2 may be relatively short, when the terminal device 1 transmits information on the slot 2, interference will be caused to information received by the terminal device 2, where the interference is inter-UE interference. When the base station 2 transmits information to the terminal device 2, interference will be caused to information received by the base station 1, where the interference is inter-TRP interference. Both inter-UE interference and inter-TRP interference may be considered as cross interference. A scenario of cross interference may also be shown in FIG. 1b. A general node B (gNB) transmits information to a relay node (RN) 1, and the terminal device transmits information to an RN 2. When the gNB and the terminal device send the information in the same slot, the information sent by the terminal device causes interference to the RN 1, and the interference is also cross interference. When the cross interference is high, it will lead to failure of normal data transmission. To resolve such a problem, scheduling terminal devices with relatively high inter-cell interference simultaneously needs to be avoided. For example, coordination may be performed by means of scheduling, beams, power, and the like. To perform coordination between base stations, the base stations need to learn of statuses of the inter-UE interference and the inter-TRP interference.

The cross interference, such as the inter-UE interference, is interference caused by uplink transmission to downlink transmission, but interference measurement methods in the prior art mainly measure co-directional interference such as interference caused by downlink transmission to downlink transmission. Therefore, the interference measurement methods in the prior art are inapplicable to cross interference measurement.

SUMMARY

Embodiments of this application provide a signal transmission method and device, and a system, to improve flexibility of resource configuration of a reference signal and are applicable to a scenario of cross interference measurement.

According to a first aspect, an embodiment of this application provides a signal transmission method, including:

receiving, by a first device, first information sent by a second device, where the first information is used to indicate a resource of a reference signal; and determining to perform at least one of interference measurement and channel measurement on the resource, or to transmit the reference signal on the resource.

By applying the foregoing technical solution, the second device can transmit the first information to the first device that is in a transmitting state or a receiving state, so that the resource of the reference signal is configured for the first device, and flexibility of resource configuration of the reference signal is improved. When this technical solution is applied to cross interference measurement such as inter-UE interference measurement, a pattern (pattern) of an interference measurement signal resource configured by a transmit-end base station for a transmit-end terminal device matches the pattern of an interference measurement resource configured by a receive-end base station for a receive-end terminal device. Therefore, the receive-end terminal device is facilitated to receive the interference measurement signal on the interference measurement resource to perform corresponding interference measurement, where the interference measurement signal is transmitted by the transmit-end terminal device; a status of interference caused by the transmit-end terminal device onto the receive-end terminal device is obtained, and accuracy of inter-UE interference measurement is improved.

It should be noted that the receive-end terminal device is a terminal device that is configured to receive an interference measurement signal, perform interference measurement, and transmit a reported value; the receive-end base station is a base station that is configured to allocate the interference measurement resource to the terminal device, and receive the reported value; the transmit-end terminal device is a terminal device that is configured to transmit the interference measurement signal; and the transmit-end base station is used to indicate a signal that is used by the transmit-end terminal device as the interference measurement signal. Using FIG. 1a as an example, a terminal device 2 is a receive-end terminal device, a base station 2 is a receive-end base station, a terminal device 1 is a transmit-end terminal device, and a base station 1 is a transmit-end base station. In FIG. 1, only one transmit-end terminal device and one transmit-end base station are illustrated. In an application scenario of this embodiment of this application, there may be a plurality of transmit-end terminal devices or a plurality of transmit-end base stations, which is not limited herein.

It should be further noted that the resource of the reference signal that is indicated by the first information may be one reference signal resource or a plurality of reference signal resources, which is not limited in this embodiment of this application. In one embodiment, the resource of the reference signal in the embodiment of this application may be a resource of a non-zero-power reference signal, or a resource of a zero-power reference signal. When the resource of the reference signal is a resource of a non-zero-power reference signal, the terminal device transmits a non-zero-power reference signal on the resource of the reference signal, or receives the non-zero-power reference signal on the resource of the reference signal, and performs at least one of channel measurement or interference measurement. When the resource of the reference signal is configured as a resource of a zero-power reference signal, the terminal device transmits a zero-power reference signal (that is, power of the transmitted reference signal is 0, which means that no reference signal is transmitted) on the resource of the reference signal, or performs at least one of channel measurement or interference measurement on the resource.

Based on the first aspect, in one embodiment, the first device receives second information sent by the second device, where the second information is used to indicate a transmission direction of the first device on the resource; and then the first device determines, based on the second information, to perform at least one of interference measurement and channel measurement on the resource, or to transmit the reference signal on the resource.

By applying the foregoing technical solution, it is simpler for the first device to determine to perform at least one of signal interference measurement and channel measurement on the resource indicated by the first information, or to determine to transmit a signal on the resource indicated by the first information, and the technical solution is easy to implement.

In one embodiment, the transmission direction of the first device on the resource may be indicated by indicating whether the first device transmits a signal or receives a signal on the resource, or the transmission direction of the first device on the resource may be indicated by indicating whether configuration of the resource is uplink configuration or downlink configuration.

In addition, when it is predefined that configuration of some resources is uplink configuration or downlink configuration that is fixed, if the resource indicated by the first information is on such resources, the first device does not need to be indicated by using the second information. In one embodiment, according to a predefined rule, the first device determines the transmission direction of the first device on the resource; and then determines, based on the transmission direction of the first device on the resource, to perform at least one of interference measurement and channel measurement on the resource, or to transmit the reference signal on the resource.

Based on the first aspect, in one embodiment, the predefined rule is used to indicate a fixed transmission direction corresponding to the resource.

Based on the first aspect, in one embodiment, that the second information is used to indicate a transmission direction of the first device on the resource includes:

the second information is used to indicate a transmission direction on the resource; or the second information is used to indicate a receiving or transmitting state of the first device.

Based on the first aspect, in one embodiment, if the reference signal is a CSI-RS, the resource of the reference signal that is indicated by the first information is a CSI-RS resource; and the first device determines, when the transmission direction of the first device on the CSI-RS resource is uplink, to transmit the reference signal on the resource.

By applying the foregoing technical solution, cross interference measurement can be performed by using the CSI-RS, thereby simplifying the method of cross interference measurement.

Based on the first aspect, in one embodiment, if the reference signal is a sounding reference signal (SRS), the resource of the reference signal that is indicated by the first information is an SRS resource; and the first device determines, when the transmission direction of the first device on the SRS resource is downlink, to perform at least one of interference measurement and channel measurement on the resource.

By applying the foregoing technical solution, cross interference measurement can be performed by using the SRS, thereby simplifying the method of cross interference measurement.

According to a second aspect, an embodiment of this application provides a signal transmission method, including:

transmitting, by a second device, first information to a first device, where the first information is used to indicate a resource of a reference signal; and transmitting, by the second device, second information to the first device, where the second information is used to indicate a transmission direction of the first device on the resource. By applying the foregoing technical solution, the transmission direction of the first device on the resource can be indicated to the first device, and therefore, based on the transmission direction, the first device can determine to perform at least one of signal interference measurement and channel measurement on the resource indicated by the first information, or to determine to transmit a signal on the resource indicated by the first information, and the technical solution is easy to implement.

Based on the second aspect, in one embodiment, that the second information is used to indicate a transmission direction of the first device on the resource includes: the second information is used to indicate a transmission direction on the resource; or the second information is used to indicate a receiving or transmitting state of the first device.

By applying the foregoing technical solution, two embodiments of the second information are provided.

According to a third aspect, an embodiment of this application provides a signal transmission device, including a transceiver module and a processing module, where:

the transceiver module is configured to receive first information sent by a second device, where the first information is used to indicate a resource of a reference signal; and the processing module is configured to determine to perform at least one of interference measurement and channel measurement on the resource, or to transmit the reference signal on the resource.

Based on the third aspect, in one embodiment, the transceiver module is further configured to receive second information sent by the second device, where the second information is used to indicate a transmission direction of the first device on the resource; and the processing module is configured to determine, based on the second information, to perform at least one of interference measurement and channel measurement on the resource, or to transmit the reference signal on the resource.

Based on the third aspect, in one embodiment, that the second information is used to indicate a transmission direction of the first device on the resource includes: the second information is used to indicate a transmission direction on the resource; or the second information is used to indicate a receiving or transmitting state of the first device.

Based on the third aspect, in one embodiment, the processing module is configured to determine the transmission direction of the first device on the resource according to a predefined rule; and based on the transmission direction of the first device on the resource, determine to perform at least one of interference measurement and channel measurement on the resource, or to transmit the reference signal on the resource.

Based on the third aspect, in one embodiment, the predefined rule is used to indicate a fixed transmission direction corresponding to the resource.

Based on the third aspect, in one embodiment, if the reference signal is a CSI-RS, the resource of the reference signal that is indicated by the first information is a CSI-RS resource; and the processing module is configured to determine, by the first device when the transmission direction on the CSI-RS resource is uplink, to transmit the reference signal on the resource.

Based on the third aspect, in one embodiment, if the reference signal is a SRS, the resource of the reference signal that is indicated by the first information is an SRS resource; and the processing module is configured to determine, by the first device, to perform at least one of interference measurement and channel measurement on the resource when the transmission direction on the SRS resource is downlink.

It should be noted that in the third aspect and any embodiment of the third aspect, the processing module corresponds to a processor in hardware devices, and the transceiver module corresponds to a transceiver in hardware modules.

According to another aspect, an embodiment of this application further provides a network-side device, including a processor, a transceiver, and a memory. The memory is configured to store program instructions and information that is received and transmitted by the transceiver; and the processor is configured to execute the program instructions stored in the memory to implement the technical solution provided in the first aspect in this embodiment of this application or in any possible embodiment.

According to another aspect, an embodiment of this application further provides a computer storage medium that is configured to store programs of the technical solution provided in the first aspect hereof or in any possible embodiment.

According to still another aspect, an embodiment of this application provides a chip, where the chip is coupled to a transceiver in a network-side device and is configured to implement the technical solution provided in the first aspect in this embodiment of this application or in any embodiment. It should be understood that "couple" in this embodiment of this application indicates direct combinations or indirect combinations between two parts. The combination may be fixed or movable, and the combination may allow communication of a fluid, electricity, an electrical signal, or another type of signal between the two parts.

According to a fourth aspect, an embodiment of this application provides a signal transmission device, including a transceiver and a processor. The processor is configured to control the transceiver to transmit first information to a first device, where the first information is used to indicate a resource of a reference signal; and transmit second information to the first device, where the second information is used to indicate a transmission direction of the first device on the resource.

Based on the fourth aspect, in one embodiment, that the second information is used to indicate a transmission direction of the first device on the resource includes: the second information is used to indicate a transmission direction on the resource; or the second information is used to indicate a receiving or transmitting state of the first device.

It should be noted that in the fourth aspect and any possible embodiment of the fourth aspect, the processing module corresponds to a processor in hardware devices, and the transceiver module corresponds to a transceiver in hardware modules.

According to another aspect, an embodiment of this application provides a network-side device, including a processor, a transceiver, and a memory. The memory is configured to store program instructions and information that is received and transmitted by the transceiver; and the processor is configured to execute the program instructions stored in the memory to implement the technical solution provided in the second aspect in this embodiment of this application or in any embodiment.

According to another aspect, an embodiment of this application further provides a computer storage medium that is configured to store programs of the technical solution provided in the second aspect hereof or in any embodiment.

According to still another aspect, an embodiment of this application provides a chip, where the chip is coupled to a transceiver in a network-side device and is configured to implement the technical solution provided in the second aspect in this embodiment of this application or in any embodiment. It should be understood that "couple" in this embodiment of this application indicates direct combinations or indirect combinations between two parts. The combination may be fixed or movable, and the combination may allow communication of a fluid, electricity, an electrical signal, or another type of signal between the two parts.

An embodiment of this application further provides a communications system, including the device provided in the third aspect and in any embodiment and the device provided in the fourth aspect and in any embodiment.

DESCRIPTION OF EMBODIMENTS

The following describes embodiments of this application in detail with reference to accompany drawings of the specification.

Figure 2:
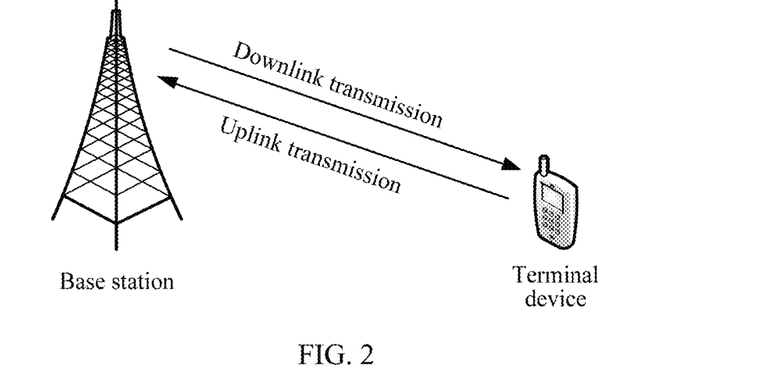
FIG. 2 is a schematic diagram of an architecture of a communications system.

It should be noted that, the embodiments of this application are applicable to, but not limited to, communications systems such as a long term evolution (LTE) system, a long term evolution-advanced (LTE-A) system, an enhanced long term evolution-advanced (eLTE) system, and a new radio (NR) system; and can be extended to wireless fidelity (WiFi), worldwide interoperability for microwave access (wimax), and cellular systems related to the 3rd Generation Partnership Project (3gpp). A communications system architecture to which the embodiments of this application are applicable may be shown in FIG. 2, and includes a base station and a terminal device. It should be noted that a communications system to which the embodiments of this application are applicable may further include a plurality of devices that have a relay function, such as an RN.

It should be noted that, the first device mentioned in the embodiments of this application may be a terminal device, or a device that has a relay function. In one embodiment, the terminal device may be a device that is configured to provide voice and/or data connectivity to a user, a handheld device with a wireless connectivity function, or another processing device connected to a wireless modem. The terminal device may be a wireless terminal. The wireless terminal may communicate with one or more core networks by using a radio access network (RAN). The wireless terminal may be a mobile terminal, such as a mobile phone (also referred to as a "cellular" phone) or a computer with a mobile terminal. For example, the computer with a mobile terminal may be a portable, pocket-sized, handheld, computer built-in, or in-vehicle mobile apparatus, which exchanges voice and/or data with the radio access network. For example, the wireless terminal may alternatively be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point (AP), a remote terminal, an access terminal, a user terminal, a user agent, a user device, or UE. The embodiments of this application are not limited thereto. The device that has a relay function in the embodiments of this application may be a repeater, a terminal device, a base station, or another relay device, which is not limited in the embodiments of this application; and a hub is a special repeater.

The second device in the embodiments of this application may be a device that has a relay function or may be a network device. When the second device is a network device, the second device may be one of various base stations (such as a macro base station or a micro base station (also known as a small cell)), a relay node, or an access point, or may be a device that communicates with a wireless terminal via one or more sectors on an air interface in an access network. When the network device is a base station, the base station may be configured to mutually convert a received over-the-air frame and an Internet Protocol (IP) packet, and is used as a router between the wireless terminal and a remaining part of the access network, and the remaining part of the access network may include an IP network. The base station may also be configured to coordinate attribute management of the air interface. In communications systems based on different radio access technologies, the name of a device that has functions of a base station may vary. For example, a base station in a Global System for Mobile Communication (GSM) or a Code Division Multiple Access (CDMA) system is called a base transceiver station (BTS), a base station in a Wideband Code Division Multiple Access (WCDMA) is called a node B, a base station in an LTE system is called an evolved node B (eNB), a base station in an NR system is called a gNB, and so on. This is not limited in the embodiments of this application.

In the embodiments of this application, when the first device is a terminal device, the second device may be a network device (such as a base station), or a relay device. For example, when the base station is far away from the terminal device, the first information that the base station needs to transmit to the terminal device needs to be transmitted to the terminal device by using a relay device. In addition, when the first device is a first relay device, the second device may be a network device, or a second relay device, where the first relay device is different from the second relay device.

The relay device mentioned in the embodiments of this application may be a device that has a relay function, for example, a repeater, a terminal device, or a base station, which is not limited in the embodiments of this application; and a hub is a special repeater.

It should be noted that, in the embodiments of this application, the interference measurement is used to measure an interfering signal, and the channel measurement is used to measure channel state information. For example, with respect to interference measurement, in LTE-A, the base station configures a CSI-IM resource for the terminal device, and on the CSI-IM resource, the terminal device measures signal power received on the resource and the like, and estimates interference on the CSI-IM based on parameter information such as RSRP. With respect to channel measurement, in LTE-A, the base station configures a CSI-RS resource for the terminal device, and the terminal device performs measurement on the CRS-RS resource, and based on a measurement result, calculates a channel quality indicator (CQI) to indicate a channel status.

The following gives a description by using an example in which the first device is a terminal device and the second device is a base station.

Figure 3:
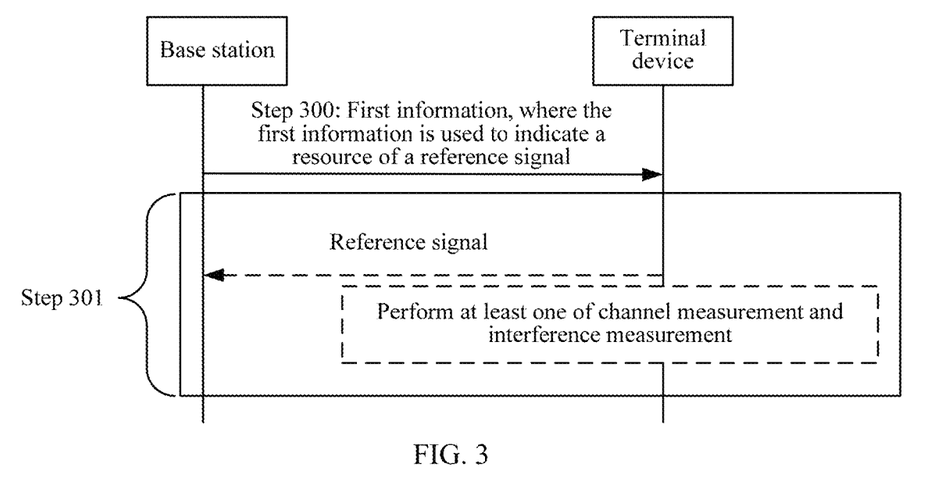
FIG. 3 is a schematic flowchart of a signal transmission method according to an embodiment of this application.

As shown in FIG. 3, a signal transmission method according to an embodiment of this application includes:

Operation 300: A base station transmits first information to a terminal device, where the first information is used to indicate a resource of a reference signal.

Operation 301: After receiving the first information sent by the base station, the terminal device determines to perform at least one of interference measurement and channel measurement on the resource, or to transmit the reference signal on the resource.

It should be noted that the resource of the reference signal that is indicated by the first information may be one reference signal resource or a plurality of reference signal resource, which is not limited in this embodiment of this application. In one embodiment, the resource of the reference signal in the embodiment of this application may be a resource of a non-zero-power reference signal, or a resource of a zero-power reference signal. When the resource of the reference signal is a resource of a non-zero-power reference signal, the terminal device transmits a non-zero-power reference signal on the resource of the reference signal, or receives the non-zero-power reference signal on the resource of the reference signal, and performs at least one of channel measurement or interference measurement. When the resource of the reference signal is configured as a resource of a zero-power reference signal, the terminal device transmits a zero-power reference signal (that is, power of the transmitted reference signal is 0, which means that no reference signal is transmitted) on the resource of the reference signal, or performs at least one of channel measurement or interference measurement on the resource.

In one embodiment of this application, the non-zero-power reference signal is a reference signal whose transmit power is greater than 0, and the zero-power reference signal is a reference signal whose transmit power is 0, which means that no reference signal is transmitted.

In one embodiment of this application, the base station may send a resource configuration of a same type of reference signal to the terminal device that is in an uplink transmitting state or a downlink receiving state, for example, a resource configuration of the CSI-RS or a resource configuration of the SRS. In performing inter-UE interference measurement, a resource of a same type of reference signal is configured for a terminal device that transmits a measurement signal in the interference measurement and a terminal device that performs the interference measurement, so that matching is accomplished between a resource that is used to transmit the measurement signal and an interference measurement resource, which helps to obtain a status of interference caused by the terminal device that transmits the measurement signal onto the terminal device that performs the interference measurement, and helps to improve accuracy of measurement of inter-UE interference.

It should be noted that in one embodiment of this application, uplink means a direction in which the terminal device transmits data to the base station, and downlink means a direction in which the base station transmits data to the terminal device.

In one embodiment of this application, the base station may transmit the first information to a terminal device that is in an uplink state or a downlink state, where the first information is used to indicate the resource of the reference signal. Therefore, after receiving the first information, the terminal device needs to determine whether the resource configuration of the reference signal is used for downlink or uplink. In one embodiment, the base station transmits second information to the terminal device, where the second information is used to indicate a transmission direction of the terminal device on the resource. Therefore, based on the second information, the terminal device can determine to perform at least one of interference measurement and channel measurement on the resource, or to transmit the reference signal on the resource. For example, when the transmission direction of the terminal device on the resource is uplink, the terminal device may determine to transmit the reference signal on the resource; when the transmission direction of the terminal device on the resource is downlink, the terminal device may determine to perform at least one of interference measurement and channel measurement on the resource.

In one embodiment of this application, the second information may be, for example, a bitmap (bitmap), and is used to indicate whether the resource configuration of the reference signal is used for uplink or downlink. For example, the bitmap may be used to indicate whether each resource configuration in a resource configuration set of a reference signal in the base station is used for uplink or downlink. For example, the resource configuration set of the reference signal includes resource configurations of five reference signals, and five-bit information may be used to indicate whether the resource configuration of each reference signal is used for uplink or downlink. For example, assuming that a bit 1 indicates that the resource configuration of the reference signal corresponding to the bit is used for uplink, and a bit 0 indicates that the resource configuration of the reference signal corresponding to the bit is used for downlink. If resource configurations of the five reference signals are used for uplink, uplink, downlink, downlink, and uplink respectively, then the bitmap is 11001. If the base station allocates resources of two reference signals in a reference signal resource set to the terminal device, where the bits corresponding to the resources of the two reference signals are located in the first place and the second place respectively as counted from the left to the right in the bitmap, then the resource configuration indicated by the second information is used for uplink. In addition, the base station may separately notify whether the resource configuration of the reference signal indicated by the first information is used for downlink or uplink. It is assumed that the bit 1 indicates that the resource configuration of the reference signal is used for uplink, and the bit 0 indicates that the resource configuration of the reference signal is used for downlink. If the base station configures a resource of a reference signal as being used for uplink, the second information includes a bit 1. Bits in the second information that are used to indicate different resource configurations of reference signals may be discontinuous. The foregoing method is only an example. The type of implementation of the second information is not limited in the embodiments of this application. It should be noted that the second information may be carried in radio resource control (RRC) signaling, or carried in other signaling, such as a broadcast message, a system information block (SIB), a master information block (MIB), a media access control control element (MAC CE), or physical layer signaling (such as, downlink control information (DCI)). This is not limited in this embodiment of this application.

Further, that the second information is used to indicate the transmission direction of the terminal device on the resource may be: the second information is used to indicate the transmission direction on the resource. The transmission direction on the resource means whether the resource is an uplink resource or a downlink resource, and may be specified between the terminal device and the base station in advance by using a protocol or the like, or may be dynamically configured by the base station, which is not limited in the embodiments of this application.

For example, in a LTE-A communications system, time division duplexing (TDD) supports seven uplink-downlink configurations, the base station configures the uplink-downlink configuration of TDD by using RRC signaling, and based on configuration information of the uplink-downlink configurations, the terminal device can determine whether the transmission direction on each subframe is uplink or downlink. Based on the seven configurations in the LTE, the transmission direction on each of subframes numbered 0, 2, and 5 is the same. That is, based on the seven uplink-downlink configurations, the transmission direction on the subframes numbered 0, 2, and 5 is downlink, uplink, and downlink respectively. Therefore, in an LTE-A system, if the resource configuration of the reference signal is located on such subframes numbered 0, 2, and 5, the terminal device can directly determine whether the resource configuration of the reference signal is used for downlink or uplink, without using uplink-downlink configuration information sent by the base station. In this case, the ratios are equivalent to a predefined rule of a protocol. In addition, in a flexible duplex scenario in NR, the transmission direction on each time domain resource element may change dynamically. It should be noted that in one embodiment of this application, the time domain resource element may be a slot, a transmission time interval (TTI), a subframe, a mini-slot, or another structure of the same function, which is not limited in the embodiments of this application. The following describes a time domain resource element as an example. A transmission direction of the time domain resource element may be configured by the base station, or may be predefined. The method for configuring the transmission direction of the time domain resource element is not limited in the embodiments of this application. For example, if the base station configures the transmission direction of a time domain resource element 5 as downlink and the time domain resource element in which the resource is located is the time domain resource element 5, the second information indicates that the transmission direction on the resource is downlink. In addition, in the flexible duplex scenario of NR, there are some time domain resource elements in a fixed transmission direction. That is, the transmission directions of all cells on such time domain resource elements are uplink or downlink. The time domain resource elements with fixed transmission directions may be agreed on beforehand between the terminal device and the base station by means of, for example, a protocol. For example, the protocol predefines time domain resource elements on which the transmission direction is fixed uplink or fixed downlink, or the base station may configure such time domain resource elements. Therefore, the transmission direction on the resource indicated by the second information includes the transmission direction of the slot in which the resource is located. If the protocol predefines a time domain resource element on which the transmission direction is fixed, and the configured reference signal resource is located on the fixed time domain resource element, the terminal device can determine the transmission direction on the resource of the reference signal according to the predefined rule. The predefining methods may include other methods. For example, a synchronization signal in a communications system is generally a downlink signal. To facilitate the terminal device to access the base station, an initial time-frequency resource of the synchronization signal is generally predefined in the protocol. If the resource of the reference signal and the resource of the synchronization signal are in a same time domain location, because the transmission direction of the terminal device on a frequency band at the same moment may be the same, the terminal device can determine that the transmission direction on the resource of the reference signal is downlink, and further determine to perform at least one of interference measurement and channel measurement on the resource. In addition, the predefining methods may include other methods. In summary, the principle of the predefining methods is that the terminal device can determine, based on such predefined information, whether to transmit the reference signal or to perform at least one of channel measurement or interference measurement on a configured reference signal resource. Content of the predefined information is not limited in the embodiments of this application.

The second information may be used to indicate a transmission direction of one or more time domain resource elements. Content indicated by the second information includes the transmission direction of the resource of the reference signal on the time domain resource elements. Alternatively, the second information is used to indicate a format of one or more time domain resource elements. The format of the time domain resource elements is diversified. For example, each symbol in a time domain resource element is downlink, or each symbol in the time domain resource element is uplink, or the time domain resource element includes both uplink symbols and downlink symbols, and may include other parts, and so on. The content indicated by the second information includes format information of the time domain resource element in which the resource of the reference signal is located. Based on the second information, the terminal device may determine the transmission direction of the symbol in which the resource of the reference signal is located. The second information may also be used to indicate scheduling information of the base station. For example, the scheduling of the base station on a time domain resource element is downlink scheduling or uplink scheduling, and the terminal device may determine, based on the second information, the transmission direction on the time domain resource element in which the resource of the reference signal is located. The second information may also be used to indicate other information or configuration, and the terminal device may determine the transmission direction on the resource of the reference signal by using the configuration, which is equivalent to an implicit indication method. Content indicated by the second information is not limited in the embodiments of this application.

The second information in the foregoing method indicates only the transmission direction on the time domain resource. This method is mainly applicable to a scenario in which the terminal device can use only one transmission direction at the same moment. Because NR supports a very large bandwidth, the terminal device may use different transmission directions in different frequency domain locations (such as, inter-band), or in a full-duplex scenario, the transmission direction of the terminal device on different frequency domain resources on the same time domain resource may vary. Therefore, the second information may also be used to indicate a time domain resource and/or a frequency domain resource, to indicate a time domain resource and/or frequency domain resource for which the transmission direction is intended.

In addition, that the second information is used to indicate the transmission direction of the terminal device on the resource may be: the second information is used to indicate a transmitting or receiving state of the terminal device. In one embodiment, the transmitting or receiving state of the terminal device is a signal transmitting state or a signal receiving state of the terminal device.

The second information may also be directly used to indicate a behavior of the terminal device, for example, directly instruct the terminal device to transmit the reference signal on the resource of the reference signal, or directly instruct the terminal device to perform at least one of interference measurement and channel measurement on the resource of the reference signal. The terminal device may determine, based on the behavior indicated by the second information, whether the transmission direction is uplink or downlink on the resource or whether the state is a transmitting state or a receiving state on the resource.

In another embodiment of determining whether the resource configuration of the reference signal is used for downlink or uplink, the terminal device determines the transmission direction of the terminal device on the resource of the reference signal according to a predefined rule; and based on the transmission direction of the terminal device on the resource, determines to perform at least one of interference measurement and channel measurement on the resource, or to transmit the reference signal on the resource.

In one embodiment of this application, the terminal device may also determine the transmission direction of the terminal device on the resource based on both the predefined rule and the second information. For example, in a flexible duplex scenario, it can be predefined that a time domain resource element of a fixed uplink configuration or downlink configuration exists in one or several fixed locations (or a number or an index) of a time domain resource element set, but the base station may configure a quantity of time domain resource elements in a time domain resource element set and/or a starting or end position of the time domain resource element set. In this case, the terminal device needs to determine the transmission direction on the reference signal resource based on both the predefined rule and the second information indicated by the base station. There may be other methods that combine the pre-defined rule and the indication of the base station, which is not limited by the embodiments of this application.

In the prior art, for uplink transmission of a system, an SRS is used to perform channel measurement; and for downlink transmission of the system, a CSI-RS is used to perform interference measurement.

Figure 4A:
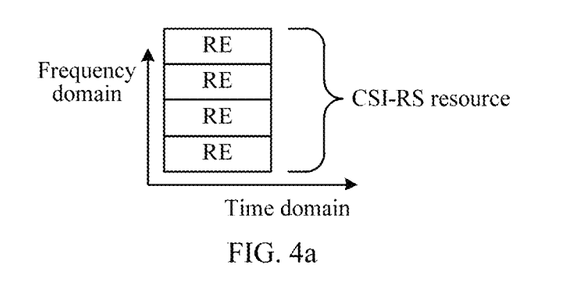
FIG. 4a and FIG. 4b are schematic diagrams of a CSI-RS resource according to an embodiment of this application.
Figure 4B:
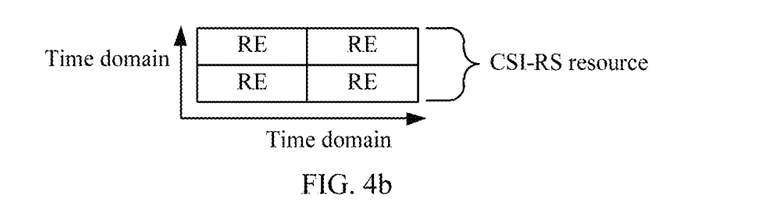
Figure 5:
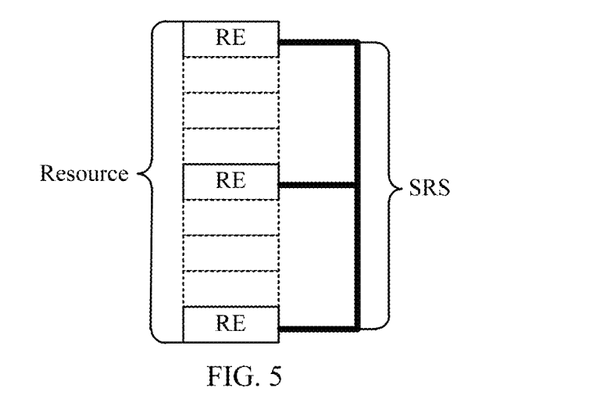
FIG. 5 is a schematic diagram of a resource for transmitting an SRS according to an embodiment of this application.

For inter-UE interference measurement, a possible inter-UE interference measurement method is: A transmit-end terminal device in the interference measurement transmits an SRS as a measurement signal, and a receive-end base station configures a CSI-RS resource for a receive-end terminal device to perform interference measurement and/or channel measurement. A CSI-RS resource in an existing NR technology includes one or more CSI-RS resource element patterns (component CSI-RS RE pattern), where the component CSI-RS RE pattern is (Y, Z), Y is a quantity of consecutive resource elements (Resource Element, RE) in frequency domain, and Z is a quantity of consecutive REs in time domain. Candidates of (Y, Z) include (1, 2), (2, 1), (4, 1), (8, 1), (2, 2), (2, 4), and the like. For example, when the CSI-RS resource includes the component CSI-RS RE pattern (4, 1), the CSI-RS resource is shown in FIG. 4a; when the CSI-RS resource includes the component CSI-RS RE pattern (2, 2), the CSI-RS resource is shown in FIG. 4b. The transmit-end base station configures a comb-patterned resource for the transmit-end terminal device to transmit an SRS. Subcarrier spacing of the comb of the SRS is two subcarriers or four subcarriers. When the subcarrier spacing of the SRS is four subcarriers, the comb-patterned resource configured by the transmit-end base station for the transmit-end terminal device is shown in FIG. 5. Because existing component CSI-RS RE patterns cannot be combined to obtain the comb resource shown in FIG. 5, the pattern of the CSI-RS resource configured by the receive-end base station for the receive-end terminal device does not match the pattern of the comb-patterned resource that is configured by the transmit-end base station for the transmit-end terminal device for the use of transmitting the SRS, and interference between one UE and another cannot be measured accurately.

It should be noted that the receive-end terminal device is a terminal device that is configured to receive an interference measurement signal, perform interference measurement, and transmit a reported value; the receive-end base station is a base station that is configured to allocate the interference measurement resource to the terminal device, and receive the reported value; the transmit-end terminal device is a terminal device that is configured to transmit the interference measurement signal; and the transmit-end base station is configured to indicate a signal that is used by the transmit-end terminal device as the interference measurement signal. Using FIG. 1a as an example, a terminal device 2 is a receive-end terminal device, a base station 2 is a receive-end base station, a terminal device 1 is a transmit-end terminal device, and a base station 1 is a transmit-end base station. In FIG. 1, only one transmit-end terminal device and one transmit-end base station are illustrated. In an application scenario of the embodiments of this application, there may be a plurality of transmit-end terminal devices or a plurality of transmit-end base station, which is not limited herein.

The terminal and the base station in one embodiment of this application may be a transmit-end terminal device and a transmit-end base station, or may be a receive-end terminal and a receive-end base station.

To accomplish matching between the pattern of the resource that is used for transmitting a measurement signal in the interference measurement and the pattern of the resource that is used for receiving the measurement signal, a first method is that the transmit-end terminal device still transmits the SRS (the resource for the SRS is in a comb pattern) as the measurement signal in the interference measurement, and the receive-end base station also configures a matched SRS resource for the receive-end terminal device to perform interference measurement. To avoid defining a new resource allocation method, a feasible configuration method is that a receive end multiplexes an uplink SRS resource, that is, the receive-end base station may deliver an interference measurement resource with an SRS configuration to the receive-end terminal device. A second method is that the receive-end base station still configures a CSI-RS resource to the receive-end terminal device as the interference measurement resource, but the transmit-end base station configures a matched CSI-RS resource for the transmit-end terminal device to transmit the interference measurement signal. A feasible configuration method is that a transmit end multiplexes a downlink CSI-RS resource, that is, the transmit-end base station may deliver a reference signal transmitting resource with a CSI-RS configuration to the transmit-end terminal device.

The following describes an example in which the reference signal is a CSI-RS or an SRS. When the reference signal is a CSI-RS, the terminal device may be a transmit-end terminal device that performs inter-UE interference measurement, that is, a terminal device that transmits the reference signal; the transmit-end base station that manages the transmit-end terminal device transmits first information to the transmit-end terminal device to indicate a CSI-RS resource. Different from the prior art in which the CSI-RS configuration is applicable only to downlink resource configuration, after the transmit-end terminal device receives the first information, the transmit-end terminal device can transmit the CSI-RS on the CSI-RS resource when the transmission direction of the transmit-end terminal device on the CSI-RS resource is uplink. With respect to the inter-UE interference measurement, the transmit-end terminal device transmits the CSI-RS to a receive-end terminal device on an uplink CSI-RS resource allocated by the transmit-end base station, where the CSI-RS is used for interference measurement of the receive-end terminal device. It should be noted that a sequence of the CSI-RS may be the same as an existing CSI-RS sequence, or may be different from the existing CSI-RS sequence, which is not limited in this application.

Using the scenario in FIG. 1 as an example, because a base station 1 can allocate a CSI-RS resource to a terminal device 1 for an uplink transmission direction, the terminal device 1 transmit the CSI-RS on the CSI-RS resource, and a terminal device 2 can receive the CSI-RS transmitted by the terminal device 1. In the prior art, however, the base station can allocate the CSI-RS resource to the terminal device only on a downlink resource for the use of interference measurement and channel measurement of the terminal device. The terminal device 2 can receive the CSI-RS from the terminal device 1 on the CSI-RS resource allocated by the base station 2 to the terminal device 2 and intended for a downlink transmission direction. Due to matching between the CSI-RS and the CSI-RS resource, the terminal device 2 can perform interference measurement based on the CSI-RS transmitted by the terminal device 1, and obtain an interference measurement result of interference caused by the terminal device 1 onto the terminal device 2, thereby avoiding inability of obtaining an interference status of a single terminal device in the case of a mismatch between the interference measurement resource and the interference measurement signal in the prior art.

In addition, when the reference signal is an SRS, the terminal device may be a receive-end (or measurement-end) terminal device that performs inter-UE interference measurement, that is, a terminal device that receives the reference signal (or that performs interference measurement and/or channel measurement). The base station that manages the receive-end terminal device transmits first information to the receive-end terminal device to indicate an SRS resource configuration. Different from the prior art in which the transmission direction of the SRS resource can be only configured as uplink, after the terminal device receives the first information, the terminal device performs at least one of interference measurement and channel measurement on the SRS resource when the transmission direction of the terminal device on the SRS resource is downlink. That is, the receive-end (or measurement-end) terminal device performs at least one of interference measurement and channel measurement on the downlink SRS resource configured by the base station. It should be noted that because the interference measurement resource may be a zero-power or non-zero-power reference signal resource, the SRS configuration may be a zero-power resource configuration or a non-zero-power resource configuration. If the SRS configuration may be a non-zero-power resource configuration, a reference signal sequence corresponding to the SRS resource configuration may be the same as an existing SRS sequence, or may be different from the existing SRS sequence, which is not limited in this application.

For a zero-power reference signal and a non-zero-power reference signal, the name of the resource of the reference signal may vary. For example, a non-zero-power CSI-RS reference signal resource in LTE-A is called a CSI-RS resource, and a zero-power CSI-RS resource is called a CSI-IM (interference measurement) resource. However, the configuration of the CSI-IM resource is a part of the CSI-RS resource, and essentially may be considered as a CSI-RS resource configuration. In one embodiment of this application, although all resource configurations of reference signals have the same name such as CSI-RS configuration or SRS configuration, they may actually include a zero-power reference signal resource configuration or a non-zero-power reference signal resource configuration.

Using the scenario in FIG. 1 as an example, in the prior art, a base station can allocate an SRS resource to a terminal device only on an uplink resource for the use of transmitting an SRS by the terminal device. In one embodiment of this application, however, because the base station 2 can transmit the SRS configuration to the terminal device 2, the terminal device 2 can receive, on a comb resource, the SRS transmitted by the terminal device 1. Due to matching between the SRS and the SRS resource, when performing interference measurement based on the received SRS, the terminal device 2 can obtain an interference measurement result of interference caused by the terminal device 1 onto the terminal device 2, thereby avoiding inability of obtaining an interference status of a single terminal device in the case of a mismatch between the interference measurement resource and the interference measurement signal in the prior art.

In addition to the CSI-RS and the SRS, other signals such as a reference signal (RS) may keep similar rules. For example, the base station transmits a configuration of a channel, or a signal, or an RS to the terminal device, and then by means of explicit signaling or implicit signaling, notifies the terminal device that the configuration is an uplink configuration or a downlink configuration, or instructs the terminal device to perform transmitting or receiving on the configured resource. The notification method may be similar to the SRS or CSI-RS configuration method described above. The channel, signal, or RS may be an existing channel, signal, or RS, and may be a new channel, signal, or RS that is provided for new requirements in future wireless communications systems, which is not limited in the embodiments of this application. The embodiments of this application are applicable to an integrated access and backhaul system (a communications system in which a plurality of relays exists). A relay or a device with a relay function in the system can perform downlink transmitting and uplink receiving. When receiving a channel, signal, or RS configuration, the relay or the device with a relay function may need to determine whether to receive the channel, signal, or RS from a device accessed by a relay, or to transmit a channel, signal, or RS to the device that accesses the relay device. The embodiments of this application are also applicable to other communications systems, such as a sidelink system or other existing communications systems or future wireless communications systems. The embodiments of this application do not limit application scenarios.

The foregoing embodiments primarily describe a scenario in which the first device is a terminal device and the second device is a network device (base station). In practice, the first device may be a relay device or another device, and the second device may also be a relay device or another device. For example, in a communications system in which a plurality of relays exist, the first device may be a terminal device, the second device is a relay device; or the first device is a relay device, and the second device is a network device or the like. Therefore, neither the first device nor the second device is limited in the disclosure, and both of them depend on an application scenario.

Based on the same concept, a signal transmission device is further provided in an embodiment of this application, and the device is configured to perform actions or functions of the first device described in the foregoing method embodiment.

Based on the same concept, a signal transmission device is further provided in an embodiment of this application, and the device is configured to perform actions or functions of the second device described in the foregoing method embodiment.

An embodiment of this application further provides a communications system, including a first device and a second device.

For brevity, for content of an apparatus part, refer to the method embodiments.

Figure 6A:
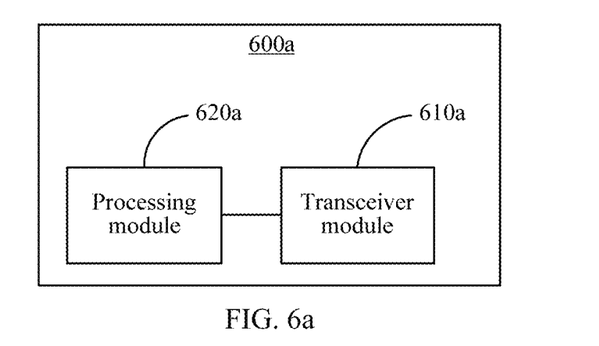
FIG. 6a and FIG. 6b are schematic diagrams of a signal transmission device according to an embodiment of this application.

As shown in FIG. 6a, a signal transmission device provided in an embodiment of this application includes a transceiver module 610a and a processing module 620a, where: the transceiver module 610a is configured to receive first information sent by a second device, where the first information is used to indicate a resource of a reference signal; and the processing module 620a is configured to determine to perform at least one of interference measurement and channel measurement on the resource, or to transmit the reference signal on the resource.

In one embodiment, the transceiver module 610a is further configured to receive second information sent by the second device, where the second information is used to indicate a transmission direction of the first device on the resource; and the processing module 620a is configured to determines, based on the second information, to perform at least one of interference measurement and channel measurement on the resource, or to transmit the reference signal on the resource.

In one embodiment, that the second information is used to indicate a transmission direction of the first device on the resource includes: the second information is used to indicate a transmission direction on the resource; or, the second information is used to indicate a receiving or transmitting state of the first device.

In one embodiment, the processing module 620a is configured to determine a transmission direction of the first device on the resource according to a predefined rule; and determine, based on the transmission direction of the first device on the resource, to perform at least one of interference measurement and channel measurement on the resource, or to transmit the reference signal on the resource.

In one embodiment, the predefined rule is used to indicate a fixed transmission direction corresponding to the resource.

In one embodiment, if the reference signal is a CSI-RS, the resource of the reference signal that is indicated by the first information is a CSI-RS resource; the processing module is configured to determine, by the first device when the transmission direction on the CSI-RS resource is uplink, to transmit the reference signal on the resource.

In one embodiment, if the reference signal is a SRS, the resource of the reference signal that is indicated by the first information is an SRS resource; and the processing module is configured to determine, by the first device when the transmission direction on the SRS resource is downlink, to perform at least one of interference measurement and channel measurement on the resource.

Figure 6B:
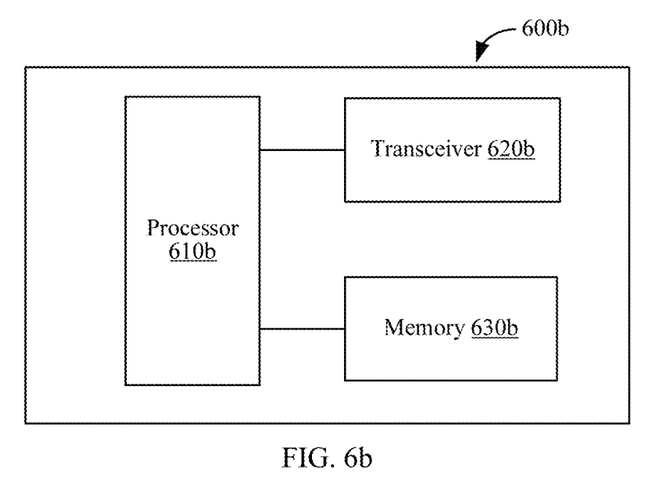

It should be noted that in one embodiment of this application, the processing module 620a may be implemented by a processor, and the transceiver module 610a may be implemented by a transceiver. In one embodiment, as shown in FIG. 6b, the signal transmission device 600b may include a processor 610b, a transceiver 620b, and a memory 630b. The transceiver 620b includes a receiver and a transmitter, and the memory 630b may be configured to store code that is executed by the processor 610b to implement the method performed by the first device described in one embodiment of this application.

The processor 610b may be a general-purpose central processing unit (CPU), a microprocessor, an application specific integrated circuit (ASIC), or one or more integrated circuits, and is configured to perform relevant operations to implement the technical solution provided in one embodiment of this application.

It should be noted that although the device 600b shown in FIG. 6b shows only the processor 610b, the transceiver 620b, and the memory 630b, in one type of process, those skilled in the art should understand that the device 600b also includes other devices required for normal operation. In addition, persons skilled in the art should understand that the device 600b may further include a hardware device for implementing another additional function as suitable. Moreover, those skilled in the art should understand that the device 600b may include only the devices or modules suitable to implement the embodiments of this application, and does not necessarily include all of the devices shown in FIG. 6b.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (ROM), a random access memory (RAM), or the like.

Figure 7A:
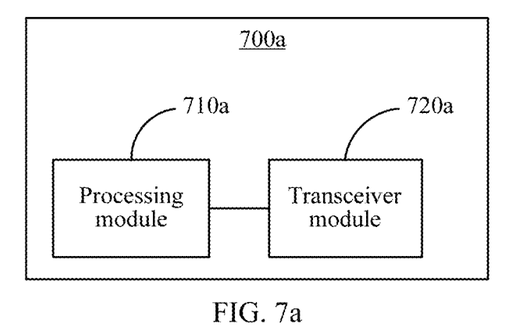
FIG. 7a and FIG. 7b are schematic diagrams of a signal transmission device according to an embodiment of this application.

As shown in FIG. 7a, a signal transmission device 700 provided in an embodiment of this application includes a processing module 710a and transceiver module 720a, where, the processing module 710a is configured to control the transceiver module 720a to transmit first information to a first device, where the first information is used to indicate a resource of a reference signal; and transmit second information to the first device, where the second information is used to indicate a transmission direction of the first device on the resource.

In one embodiment, that the second information is used to indicate a transmission direction of the first device on the resource includes: the second information is used to indicate a transmission direction on the resource; or the second information is used to indicate a receiving or transmitting state of the first device.

Figure 7B:
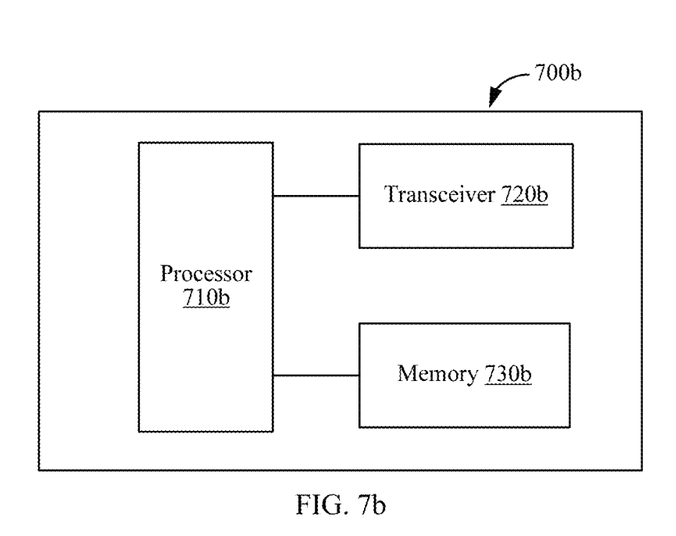

It should be noted that in one embodiment of this application, the processing module 710a may be implemented by a processor, and the transceiver module 720a may be implemented by a transceiver. In one embodiment, as shown in FIG. 7b, the device 700b may include a processor 710b, a transceiver 720b, and a memory 730b. The transceiver 720b includes a receiver and a transmitter. The memory 730b may be configured to store programs/code pre-installed before the device 700b is delivered from a factory, or may store code to be executed by the processor 710b, where the code is used to implement the method that the second device in this application needs to perform.

The processor 710b may be a general-purpose CPU, a microprocessor, an ASIC, or one or more integrated circuits, and is configured to perform a related operation, so as to implement the technical solution provided in this embodiment of this application.

It should be noted that, although only the processor 710b, the transceiver 720b, and the memory 730b are shown for the device 700b shown in FIG. 7b, in one type of process, a person skilled in the art should understand that the device 700b further includes another component suitable for normal operation. In addition, according to requirements, a person skilled in the art should understand that the device 700*b* may further include a hardware component that implements another additional function. In addition, a person skilled in the art should understand that the device 700*b* may alternatively include only a component or module suitable for implementing this embodiment of this application, but does not need to include all components shown in FIG. 7*b*.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disk, a ROM, a RAM, or the like.

Figure 8:
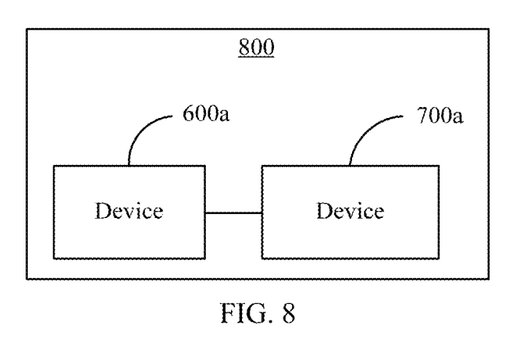
FIG. 8 is a schematic diagram of a communications system according to an embodiment of this application.

As shown in FIG. 8, a communications system 800 in an embodiment of this application includes the device 600*a* shown in FIG. 6*a* and the device 700*a* shown in FIG. 7.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer readable memory that can instruct the computer or any other programmable data processing device to work in any manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or another programmable device provide steps or processes for implementing a function in one or more processes in the flowcharts and/or in one or more blocks in the block diagrams.

Although some possible embodiments of this application have been described, persons skilled in the art can make changes and modifications to these embodiments once they learn the basic inventive concept. Therefore, the following claims are intended to be construed to cover the embodiments of this application and all changes and modifications falling within the scope of this application.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for signal transmission comprising:
 receiving, by a first device, first information sent by a base station, wherein the first information is used to indicate a resource of a reference signal;
 receiving, by the first device, second information sent by the base station, wherein the second information is used to indicate a transmission direction of the first device on the resource;
 determining, by the first device, whether to perform at least one of interference measurement and channel measurement on the resource, or to transmit the reference signal on the resource by determining, based on the second information, whether to perform the at least one of interference measurement and channel measurement on the resource, or to transmit the reference signal on the resource, wherein the second information used to indicate the transmission direction of the first device on the resource comprises: the second information being used to indicate the transmission direction on the resource, or, the second information is used to indicate a receiving or transmitting state of the first device.

2. The method according to claim 1, wherein the determining, by the first device, to perform the at least one of interference measurement and channel measurement on the resource, or to transmit the reference signal on the resource comprises:
 determining, by the first device, the transmission direction of the first device on the resource according to a predefined rule; and
 determining, by the first device based on the transmission direction of the first device on the resource according to the predefined rule, whether to perform the at least one of interference measurement and channel measurement on the resource or to transmit the reference signal on the resource.

3. The method according to claim 2, wherein the predefined rule is used to indicate a fixed transmission direction corresponding to the resource.

4. The method according to claim 1, wherein if the reference signal is a channel state information reference signal (CSI-RS), the resource of the reference signal that is indicated by the first information is a CSI-RS resource; and
 wherein, the determining by the first device to perform the at least one of interference measurement and channel measurement on the resource or to transmit the reference signal on the resource, comprises:
 determining by the first device when the transmission direction of the first device on the CSI-RS resource is uplink, to transmit the reference signal on the resource.

5. The method according to claim 1, wherein if the reference signal is a sounding reference signal (SRS), the resource of the reference signal that is indicated by the first information is an SRS resource; and
 wherein, the determining by the first device to perform the at least one of interference measurement and channel measurement on the resource or to transmit the reference signal on the resource, comprises:

determining by the first device when the transmission direction of the first device on the SRS resource is downlink, to perform the at least one of interference measurement and channel measurement on the resource.

6. A device for signal transmission comprising:

a transceiver, configured to receive first information sent by a base station, wherein the first information is used to indicate a resource of a reference signal, and second information sent by the base station, wherein the second information is used to indicate a transmission direction of the device on the resource; and a processor configured to determine to perform at least one of interference measurement and channel measurement on the resource or to transmit the reference signal on the resource by determining, based on the second information, whether to perform the at least one of interference measurement and channel measurement on the resource, or to transmit the reference signal on the resource, wherein the second information used to indicate the transmission direction of the device on the resource comprises: the second information being used to indicate the transmission direction on the resource, or, the second information is used to indicate a receiving or transmitting state of the device.

7. The device according to claim 6, wherein the processor configured to determine to perform the at least one of interference measurement and channel measurement on the resource or to transmit the reference signal on the resource comprises:

the processor being configured to: determine the transmission direction of the device on the resource according to a predefined rule; and determine, based on the transmission direction of the device on the resource according to the predefined rule, whether to perform the at least one of interference measurement and channel measurement on the resource or to transmit the reference signal on the resource.

8. The device according to claim 7, wherein the predefined rule is used to indicate a fixed transmission direction corresponding to the resource.

9. The device according to claim 6, wherein if the reference signal is a channel state information reference signal (CSI-RS), then the resource of the reference signal indicated by the first information is a CSI-RS resource; and the processor configured to determine to perform the at least one of interference measurement and channel measurement on the resource or to transmit the reference signal on the resource comprises:

the processor being configured to determine, when the transmission direction on the CSI-RS resource is uplink, to transmit the reference signal on the resource.

10. The device according to claim 6, wherein if the reference signal is a sounding reference signal (SRS), the resource of the reference signal indicated by the first information is an SRS resource; and the processor configured to determine to perform the at least one of interference measurement and channel measurement on the resource or to transmit the reference signal on the resource comprises:

processor being configured to determine, when the transmission direction on the SRS resource is downlink, to perform the at least one of interference measurement and channel measurement on the resource.

11. A system comprising:

a first device including a transceiver and processor, the transceiver configured to receive first information sent by a second device, wherein the first information is used to indicate a resource of a reference signal, and second information sent by the second device, wherein the second information is used to indicate a transmission direction of the first device on the resource, and, the processor configured to determine to perform at least one of interference measurement and channel measurement on the resource or to transmit the reference signal on the resource by determining, based on the second information, whether to perform the at least one of interference measurement and channel measurement on the resource, or to transmit the reference signal on the resource, wherein the second information used to indicate the transmission direction of the first device on the resource comprises: the second information being used to indicate the transmission direction on the resource, or, the second information is used to indicate a receiving or transmitting state of the first device; and the second device including a transceiver and a processor configured to: control the transceiver to transmit the first information to the first device, wherein the first information is used to indicate the resource of the reference signal; and transmit the second information to the first device, wherein the second information is used to indicate the transmission direction of the first device on the resource, wherein the second information used to indicate the transmission direction of the first device on the resource comprises: the second information being used to indicate the transmission direction on the resource; or the second information is used to indicate a receiving or transmitting state of the first device.

* * * * *